(12) United States Patent
Peng et al.

(10) Patent No.: US 9,965,006 B2
(45) Date of Patent: May 8, 2018

(54) ELECTRONIC DEVICE

(71) Applicant: Compal Electronics, Inc., Taipei (TW)

(72) Inventors: Ming-Chung Peng, Taipei (TW);
Chun-Chi Wang, Taipei (TW);
Jih-Houng Lee, Taipei (TW);
Shih-Chin Chou, Taipei (TW)

(73) Assignee: Compal Electronics, Inc., Taipei (TW)

( * ) Notice: Subject to any disclaimer, the term of this patent is extended or adjusted under 35 U.S.C. 154(b) by 0 days. days.

(21) Appl. No.: 15/368,688

(22) Filed: Dec. 5, 2016

(65) Prior Publication Data
US 2017/0177043 A1 Jun. 22, 2017

Related U.S. Application Data

(60) Provisional application No. 62/269,095, filed on Dec. 18, 2015.

(51) Int. Cl.
*G06F 1/20* (2006.01)
*G06F 1/16* (2006.01)

(52) U.S. Cl.
CPC ............ *G06F 1/203* (2013.01); *G06F 1/1616* (2013.01); *G06F 1/1628* (2013.01); *G06F 1/1679* (2013.01); *G06F 1/1681* (2013.01)

(58) Field of Classification Search
CPC ...... G06F 1/203; G06F 1/1681; G06F 1/1616; G06F 1/1628; G06F 1/1679; G06F 1/1615; G06F 1/1622; H05K 5/0234; F16M 13/005; F16M 11/04; F16M 11/06; F16M 11/08; F16M 11/10; F16M 2200/00; F16M 2200/021; F16M 2200/08; Y10S 248/917

See application file for complete search history.

(56) References Cited

U.S. PATENT DOCUMENTS

| | | | | |
|---|---|---|---|---|
| 8,014,147 | B2 * | 9/2011 | Chen | G06F 1/1616 200/61.62 |
| 2005/0052831 | A1 * | 3/2005 | Chen | G06F 1/1616 361/679.11 |
| 2009/0308997 | A1 * | 12/2009 | Policar | F16M 11/22 248/288.31 |
| 2011/0095143 | A1 * | 4/2011 | Wang | F16M 11/046 248/122.1 |
| 2014/0321041 | A1 * | 10/2014 | Hsu | G06F 1/1637 361/679.26 |
| 2015/0277494 | A1 * | 10/2015 | Oakley | G06F 1/1633 361/679.55 |
| 2016/0088749 | A1 * | 3/2016 | Liu | F16M 11/38 361/807 |

* cited by examiner

*Primary Examiner* — Dimary Lopez Cruz
*Assistant Examiner* — Abhishek Rathod
(74) *Attorney, Agent, or Firm* — Chieh-Mei Wang

(57) ABSTRACT

An electronic device includes a main body, a first back cover and a second back cover. The main body includes a first surface and a second surface opposite to the first surface. A display is mounted onto the first surface. The first back cover is disposed on the second surface and rotatable about a first axis. The first back cover can be lifted along a first direction by rotating about the first axis. The second back cover is disposed on the second surface and rotatable about a second axis. The second back cover can be lifted along a second direction by rotating about the second axis.

11 Claims, 8 Drawing Sheets

ELECTRONIC DEVICE

FIELD OF THE INVENTION

The present invention relates to an electronic device provided with a liftable back cover to serve as a stand, and more particularly to an electronic device provided with two back covers, wherein when one of the back covers is lifted to serve as a stand, the other back cover would be lifted simultaneously.

BACKGROUND OF THE INVENTION

Electronic devices process more and more data now, and thus more heat is generated due to the heavy load. Therefore, heat dissipation becomes very important for the electronic devices. A tablet is usually equipped with a stand to support the tablet so as to provide an optimal view angle for a user who may use the tablet in a most comfortable posture. Therefore, when the stand is lifted from the tablet by a user, it means the tablet is in use, and at this time, heat dissipation mechanism can be activated in time to dissipate heat generated by the electronic device.

SUMMARY OF THE INVENTION

An object of the present invention is to provide an electronic device including two back covers. When one of the back covers is lifted to serve as a stand, the other back cover would be lifted simultaneously to form a gap through which heat generated by electronic elements is easily dissipated so as to enhance heat dissipation for the electronic device.

The present invention provides an electronic device including a main body, a first back cover and a second back cover. The main body includes a first surface and a second surface opposite to the first surface. A display is mounted onto the first surface. The first back cover is disposed on the second surface and rotatable about a first axis. The first back cover can be lifted along a first direction by rotating about the first axis. The second back cover is disposed on the second surface and rotatable about a second axis. The second back cover can be lifted along a second direction by rotating about the second axis.

In another embodiment of the present invention, the electronic device further includes an interlinking mechanism disposed on the second surface and connecting the first back cover and the second back cover. The interlinking mechanism comprises an interlinking member movably disposed on the main body and at least one elastic member connecting the interlinking member and the main body. When the first back cover is lifted along the first direction, the elastic member exerts an elastic force on the interlinking member so as to move the interlinking member, and the interlinking member pushes the second back cover to lift the second back cover along the second direction.

In another embodiment of the present invention, the interlinking member is movable between a first position and a second position. When the first back cover is closed and covers the main body, the first back cover pushes against the interlinking member to position the interlinking member at the first position and deforms the at least one elastic member. When the first back cover is lifted along the first direction, pushing of the first back cover against the interlinking member is released and the at least one elastic member exerts the elastic force on the interlinking member to move the interlinking member to the second position, and the interlinking member pushes the second back cover and lift the second back cover along the second direction.

In another embodiment of the present invention, the interlinking member includes a first inclined surface, and the second back cover includes a second inclined surface. When the interlinking member is at the first position, the first inclined surface abuts the second inclined surface, and when the interlinking member moves from the first position to the second position, the first inclined surface pushes the second inclined surface to lift the second back cover along the second direction.

In another embodiment of the present invention, the first back cover comprises a push member, and the push member pushes against the interlinking member when the first back cover is closed and covers the main body.

In another embodiment of the present invention, the main body further includes a depression formed on the second surface, and the interlinking member is movably disposed within the depression. The depression comprises a first lateral wall and a second lateral wall opposite to the first lateral wall. When the interlinking member is at the first position, the interlinking member abuts the first lateral wall, and when the interlinking member is at the second position, the interlinking member abuts the second lateral wall.

In another embodiment of the present invention, the main body further includes at least one accommodating portion adjacent to the depression and connected to the second lateral wall, and the at least one elastic member is disposed in the depression.

In another embodiment of the present invention, the elastic member is a spring.

In another embodiment of the present invention, the first axis is parallel to the second axis.

In another embodiment of the present invention, the first direction is opposite to the second direction.

In another embodiment of the present invention, the electronic device further includes a shielding member disposed on an edge of the second back cover, wherein a plurality of holes are formed on the shielding member.

The electronic device of the present invention utilizes the interlinking mechanism which enables the first back cover and the second back cover to be lifted simultaneously. When the first back cover is lifted to serve as a stand, the second back cover is lifted simultaneously to form a gap between the second back cover and the main body. Heat generated by electronic elements in the electronic device is easily dissipated through the gap.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
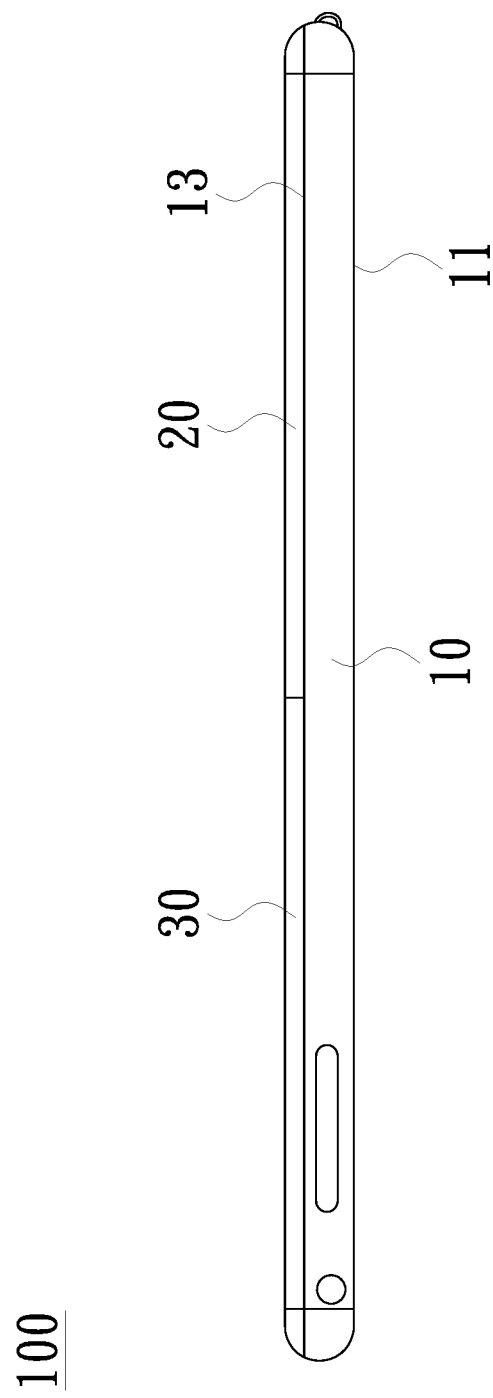
FIG. 1 is a side view of an embodiment of an electronic device of the present invention.
Figure 2:
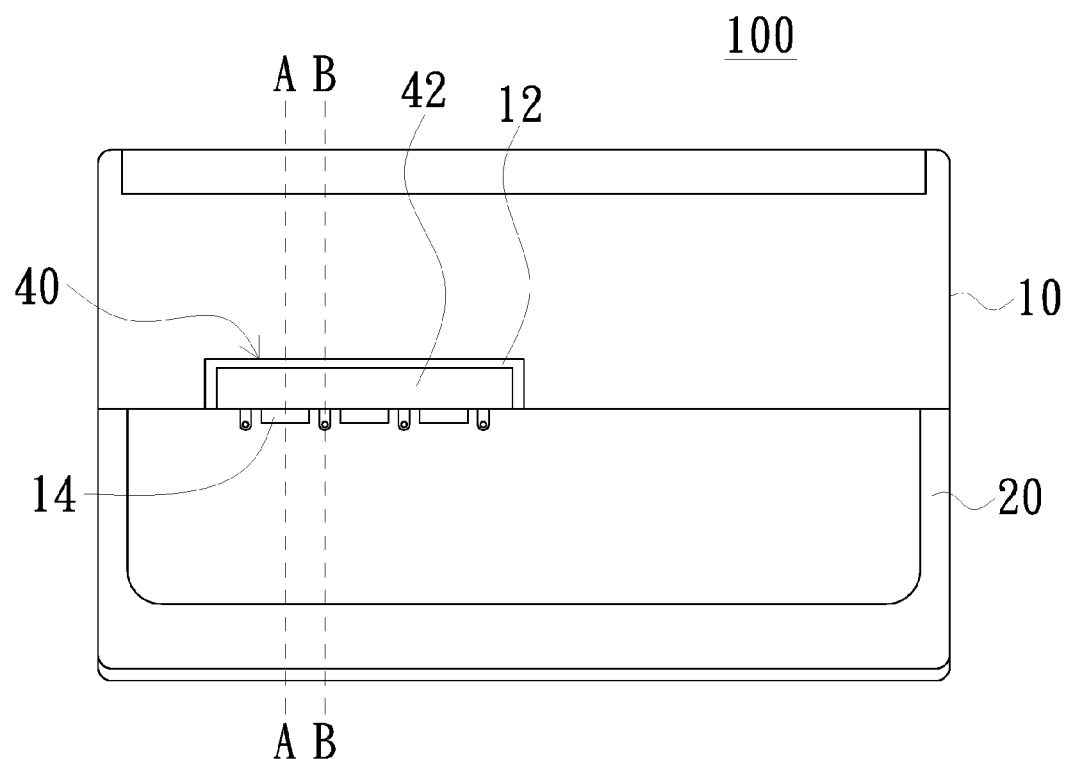
FIG. 2 is a rear view of the electronic device of FIG.1, wherein a second back cover is removed.
Figure 5:
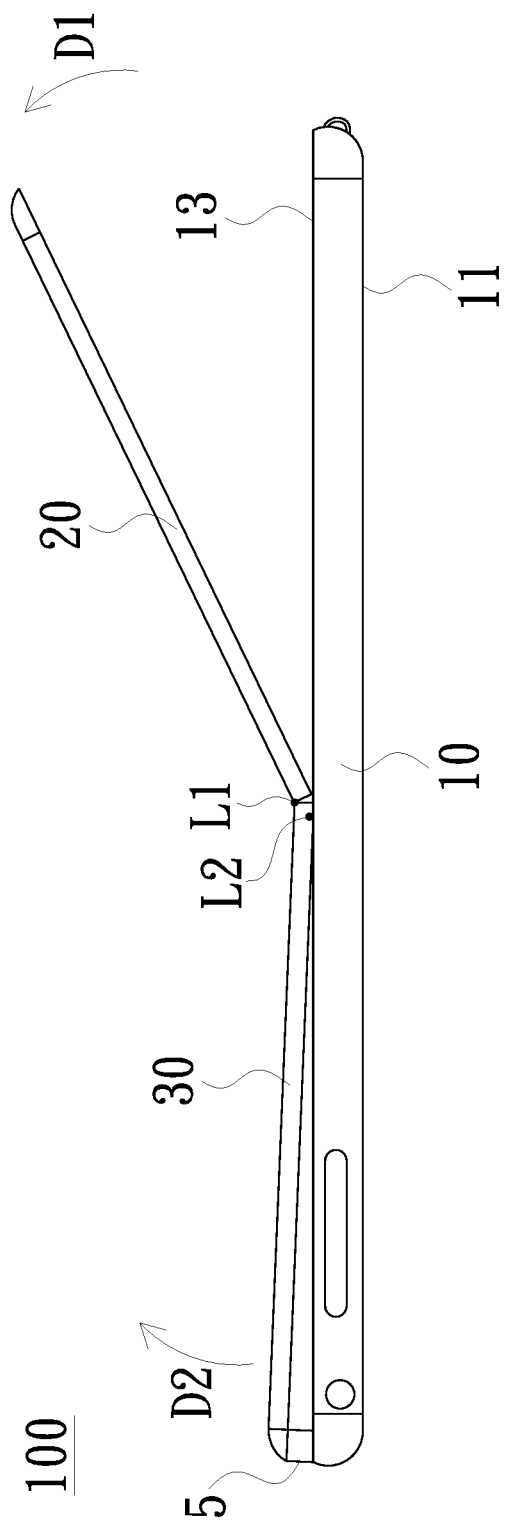
FIG. 5 is a side view of the electronic device of FIG.1, wherein a first back cover and the second back cover are lifted.

Referring to FIGS. 1, 2 and 5, an embodiment of an electronic device of the present invention is shown. The electronic device 100 includes a main body 10, a first back cover 20, a second back cover 30 and an interlinking mechanism 40.

In this embodiment, the main body 10 includes a first surface 11 and a second surface 13. A display is disposed on the first surface 11. Circuit boards, related electronic elements and heat dissipating mechanism are disposed within the main body 10. The circuit board and the electronic elements are connected to the display and show images on the display. The heat dissipation mechanism dissipates heat generated by the electronic elements. In this embodiment, the heat dissipation mechanism is a fan or a heat pipe.

In this embodiment, the first back cover 20 and the second back cover 30 are disposed on the second surface 13 of the main body 10. The first back cover 20 is disposed on the main body 10 and rotatable with respect to a first axis L1. The first back cover 20 can be lifted along a first direction D1 by rotating about the first axis L1. The second back cover 30 is disposed on the main body 10 and rotatable with respect to a second axis L2. The second back cover 30 can be lifted along a second direction D2 by rotating about the second axis L2. When the second back cover 30 is lifted, a gap is formed between the second back cover 30 and the main body 10. Heat generated by the electronic elements is dissipated through the gap, but dust also easily enters the electronic device 100 through the gap. Therefore, a shielding member 5 is mounted to an edge of the second back cover 30, and the shielding member 5 covers the gap when the second back cover 30 is lifted to prevent dust from entering the electronic device 100 through the gap. Several holes are formed on the shielding member 5 to allow the heat generated by the electronic device to dissipate through the gap. In this embodiment, the first axis L1 is near the second axis L2. The first axis L1 and the second axis L2 are not co-axial, but the first axis L1 is parallel to the second axis L2. The present invention is not limited thereto. In another embodiment, the first axis L1 and the second axis L2 are co-axial. In addition, in this embodiment, the first axis L1 is a virtual axis which allows the first back cover 20 to abut the second back cover 30 seamlessly when the first back cover 20 and the second back cover 30 are closed and cover the main body 10. For example, the virtual axis may have a sliding block sliding in an arced groove and thus the center of the arced groove becomes the first axis L1. The second axis L2 is a real axis. For example, a shaft is mounted to the main body 10 to serve as the second axis L2.

The interlinking mechanism 40 is disposed on the second surface 13 of the main body 10 and connects the first back cover 20 and the second back cover 30. When the first back cover 20 is lifted along the first direction D1, the second back cover 30 is lifted simultaneously along the second direction D2 though the interlinking mechanism 40. In this embodiment, the first direction D1 is counter-clockwise direction and the second direction D2 is clockwise direction. In this embodiment, the first back cover 20 is lifted to serve as a stand of the electronic device 100, and the second back cover 30 is lifted to form the gap which facilitates heat dissipation. The present invention is not limited thereto, the first back cover 20 and the second back cover 30 may have other functions in another embodiment. The detailed structure of the interlinking mechanism 40 is described as follows.

Figure 3:
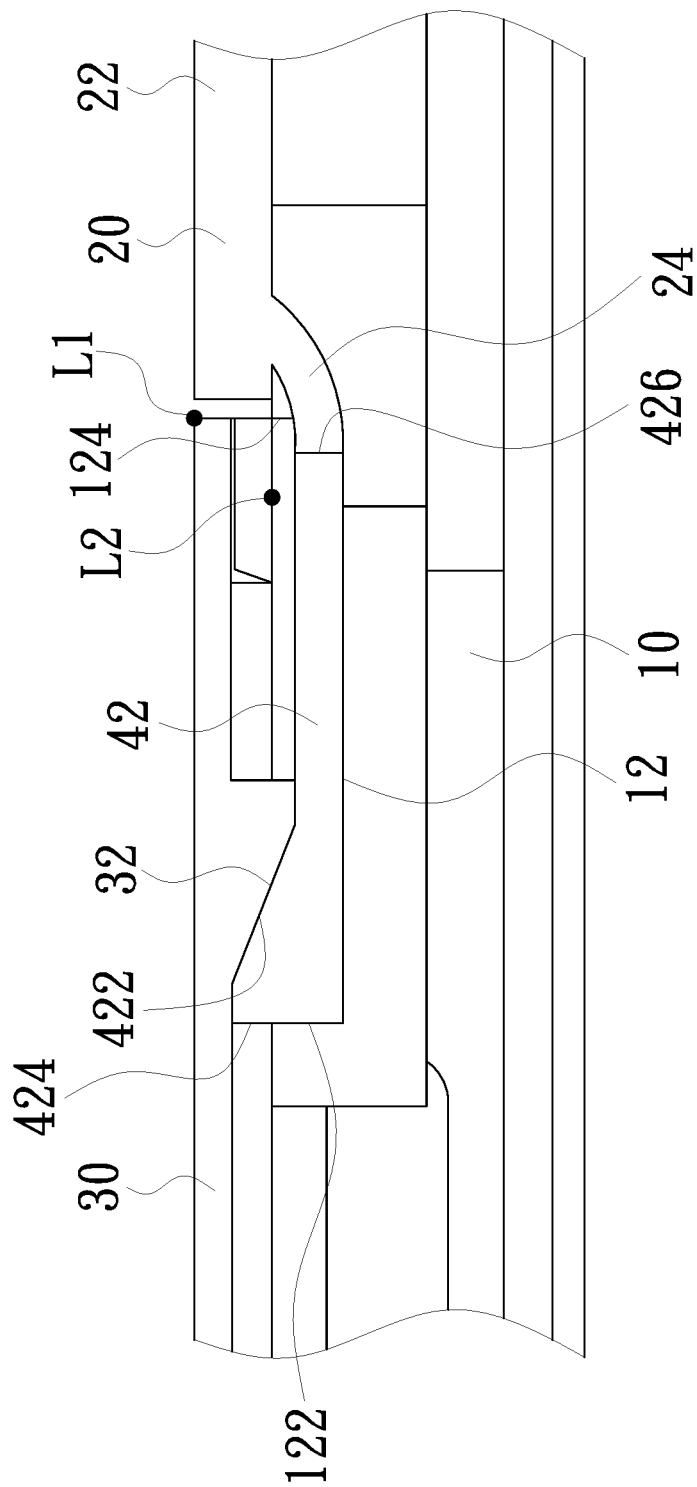
FIG. 3 is a cross section of FIG. 2 along line A-A.
Figure 4:
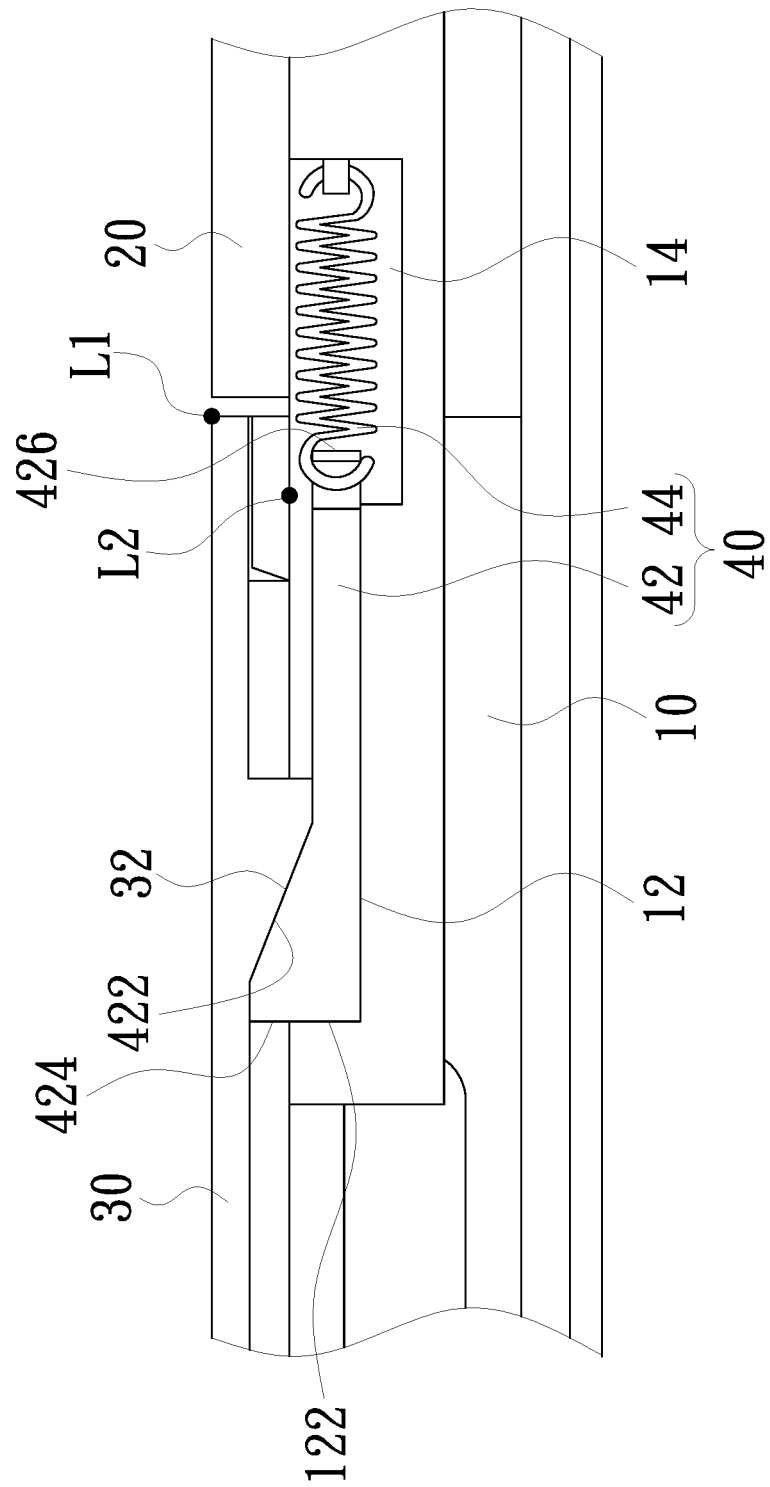
FIG. 4 is a cross section of FIG. 2 along line B-B.
Figure 6:
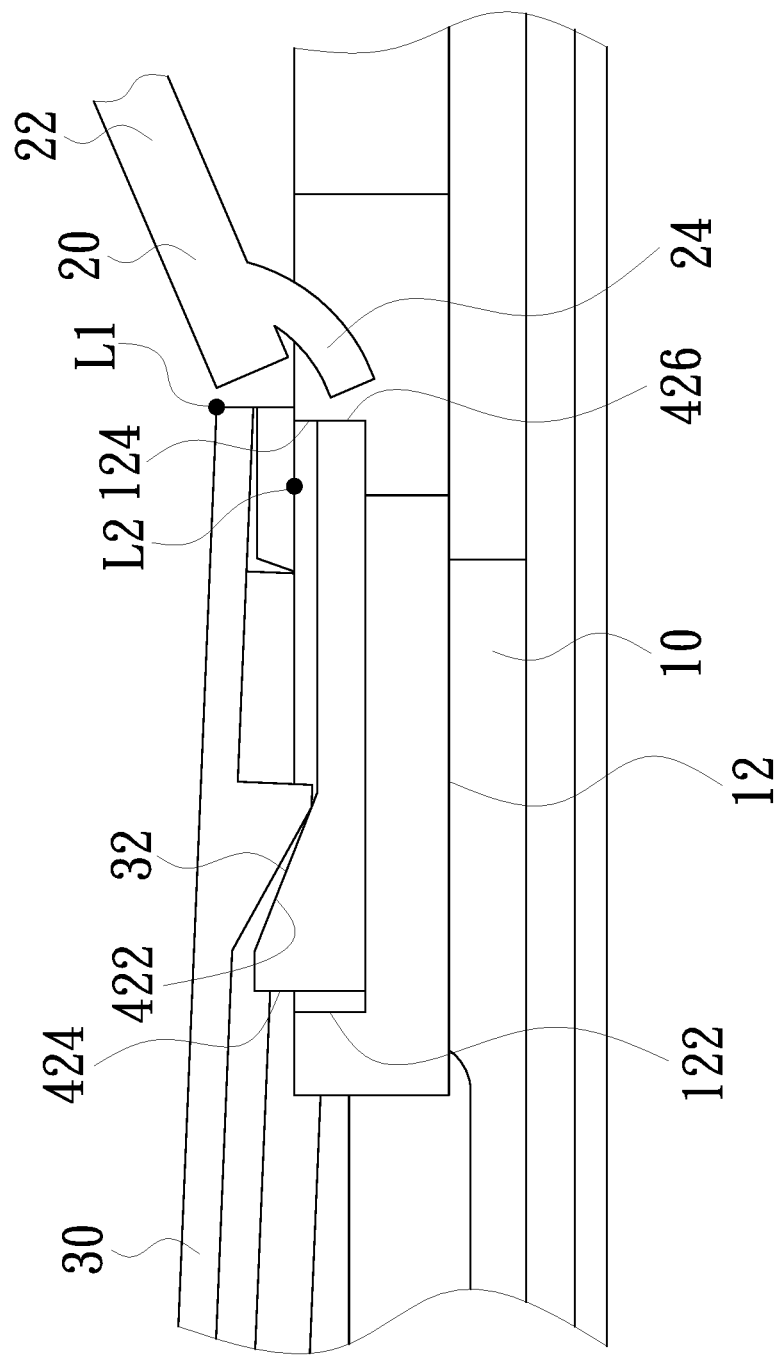
FIG. 6 is a cross section of the electronic device of FIG. 5 along the line A-A of FIG. 2.
Figure 7:
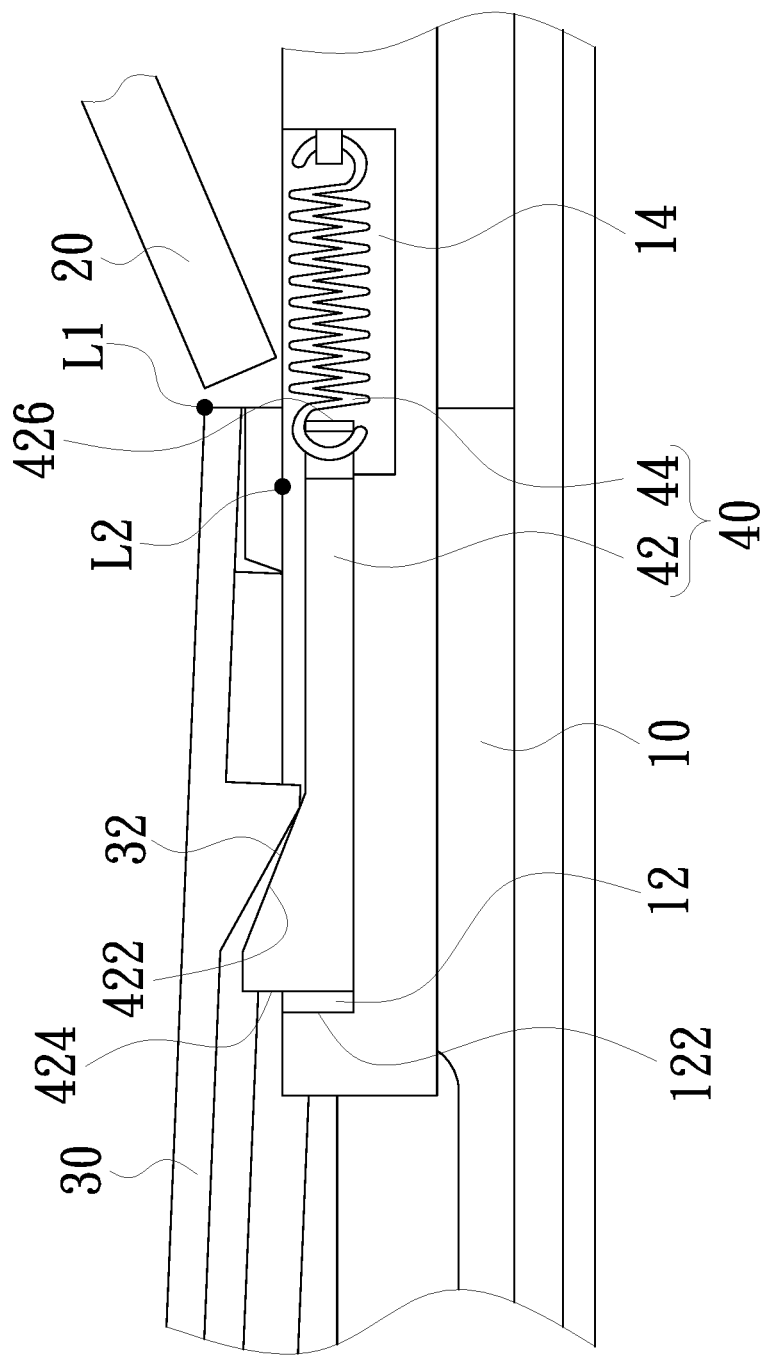
FIG. 7 is a cross section of the electronic device of FIG. 5 along the line B-B of FIG. 2.

Referring to FIGS. 2-4, 6 and 7, the interlinking mechanism 40 includes an interlinking member 42 and an elastic member 44. In this embodiment, the interlinking member 42 is board-shaped and includes a first inclined surface 422, a first end 424 and a second end 426 opposite to the first end 424. The first inclined surface 422 is connected to the first end 424 and descends along a direction from the first end 424 to the second end 426. The elastic member 44 is a spring. The interlinking member 42 is movably disposed in the main body 10. In this embodiment, the main body 10 includes a depression 12 and an accommodating portion 14. The accommodating portion 14 is adjacent to the depression 12. The interlinking member 42 is disposed in the depression 12 and movable between a first position and a second position. FIGS. 3 and 4 show the interlinking member 42 at the first position, and FIGS. 6 and 7 show the interlinking member 42 at the second position. The second back cover 30 is disposed above the depression 12 and can cover the depression 12. The depression 12 includes a first lateral wall 122 and a second lateral wall 124. The second lateral wall 124 is opposite to the first lateral wall 122. Referring to FIGS. 3 and 4, when the interlinking member 42 is at the first position, the first end 424 abuts the first lateral wall 122. Referring to FIGS. 6 and 7, when the interlinking member 42 is at the second position, the second end 426 abuts the second lateral wall 124. The elastic member 44 is disposed in the accommodating portion 14. The accommodating portion 14 is connected to the depression 12 by through holes formed on the second lateral wall 124. The elastic member 44 connects the interlinking member 42 and the main body 10. In this embodiment, one end of the elastic member 44 is fixed to a fixing point on a wall of the accommodating portion 14, and the other end of the elastic member 44 is fixed to the second end 426 of the interlinking member 42 so that the elastic member 44 connects the interlinking member 42 and the main body 10.

Referring to FIGS. 3 and 4, when the first back cover 20 is closed and covers the main body 10, the first back cover 20 pushes against the interlinking member 42 to position the interlinking member 42 at the first position and deform the elastic member 44. In this embodiment, the first back cover 20 includes a cover body 22 and a push member 24. The push member 24 is arc-shaped and extends from a bottom of the cover body 22 toward the interlinking member 42, and an end of the push member 24 extends to exceed an edge of the cover body 22. When the first back cover 20 is closed and covers the main body 10, the push member 24 moves into the depression 12 and pushes against the second end 426 of the interlinking member 42 so that the first end 424 of the interlinking member 42 pushes against the first lateral wall 122 of the depression 12, whereby the interlinking member 42 is positioned at the first position. At this time, the elastic member 44 is pulled to have larger elastic deformation. When the first back cover 20 is lifted along the first direction D1, the push member 24 leaves the depression 12, and the push of the first back cover 20 against the interlinking member 42 is thus released. The elastic force of the elastic member 44 moves the interlinking member 42 to the second position and enables the second end 426 of the interlinking member 42 abuts the second lateral wall 124. The interlinking member 42 pushes the second back cover 30 to lift the second back cover 30 along the second direction D2 when the interlinking member 42 moves from the first position to the second position.

Referring to FIGS. 3, 4, 6 and 7, the interlinking member 42 includes the first inclined surface 422, and the second back cover 30 includes a second inclined surface 32. The second inclined surface 32 is disposed on a back side of the second back cover 32 and faces the first inclined surface 422. When the interlinking member 42 is at the first position, the first inclined surface 422 abuts the second inclined surface 32. When the interlinking member 42 moves from the first position to the second position horizontally, the horizontal movement of the first inclined surface 422 pushes the second inclined surface 32 and moves the second inclined surface 32 upwards, whereby the second back cover 30 rotates about the second axis L2 and is lifted along the second direction D2. The maximal lifted angle of the second back cover 30 depends on the inclined angle of the first inclined surface 422 and the second inclined surface 32. The larger is the inclined angle of the first inclined surface 422 and the second inclined surface 32, the horizontal movement of the first inclined surface 422 causes a larger vertical movement of the second inclined surface 32. Therefore, when the interlinking member 42 moves horizontally, the second back cover 30 has a larger vertical movement, and thus obtains a larger maximal lifted angle.

In another embodiment, the first inclined surface 422 of the interlinking member 42 can be replaced by an arc-shaped protrusion, and the second back cover 30 has the second inclined surface 32. When the interlinking member 42 moves from the first position to the second position horizontally, the arc-shaped protrusion which moves horizontally pushes the second inclined surface 32 to move the second back cover 30 upwards so as to lift the second back cover 30 along the second direction D2. In another embodiment, the interlinking member 42 has the first inclined surface 422, and the second inclined surface 32 of the second back cover 30 is replaced by an arc-shaped protrusion. When the interlinking member 42 moves from the first position to the second position horizontally, the first inclined surface 422 which moves horizontally pushes the arc-shaped protrusion to move the arc-shaped protrusion upwards so as to lift the second back cover 30 along the second direction D2.

Figure 8:
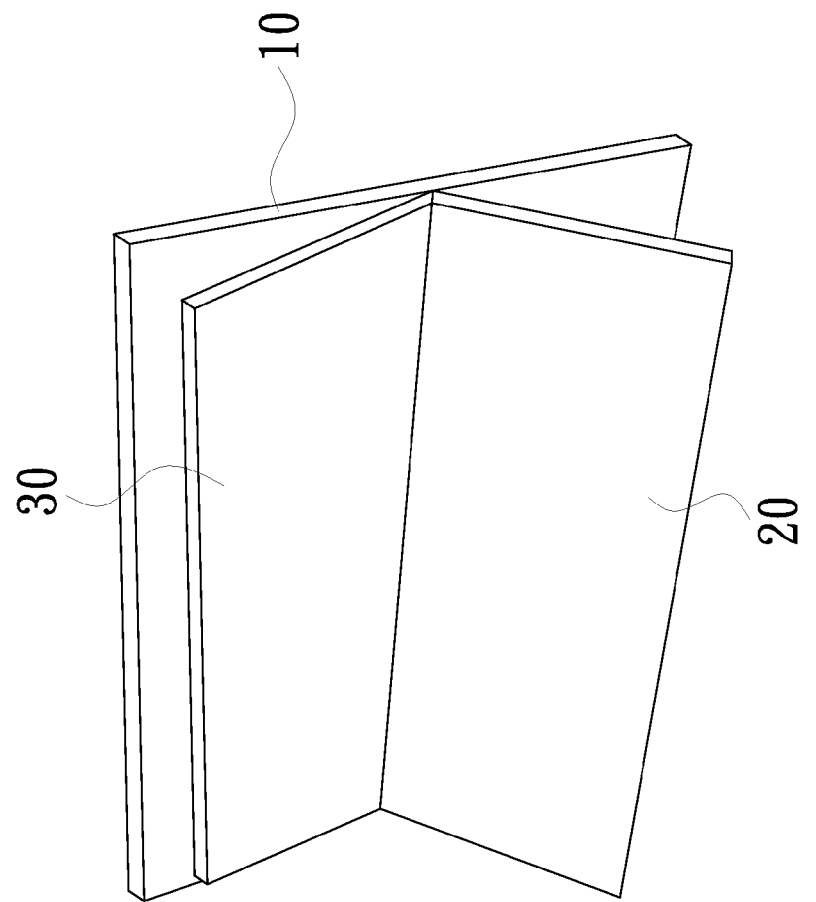
FIG. 8 is a perspective view of the electronic device of FIG. 1.

Referring to FIG. 8, in this embodiment, the electronic device 100 is a tablet. The first back cover 20 is lifted to serve as a stand. When the first back cover 20 is lifted, the second back cover 30 is lifted simultaneously through the interlinking mechanism 40 to form the gap between the second back cover 30 and the main body 10. Heat generated by electronic elements in the electronic device 100 is dissipated through the gap which facilitates heat dissipation of the electronic device 100.

The electronic device 100 of the present invention uses the interlinking mechanism 40 to enable the first back cover 2 and the second back cover 30 to be lifted simultaneously. When a user lifts the first back cover 20 to serve as a stand, the second back cover 30 is lifted simultaneously. A gap is formed between the second back cover 30 and the main body 10 when the second back cover 30 is lifted to enhance heat dissipation of the electronic device 100.

In another embodiment, the interlinking mechanism 40 is omitted. The first back cover 20 and the second back cover 30 can be lifted independently. For example, a user lifts the first back cover 20 to serve as a stand, and afterwards the user lifts the second back cover 30 to enhance heat dissipation.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An electronic device, comprising:
    a main body, comprising a first surface and a second surface opposite to the first surface, wherein a display is mounted onto the first surface;
    a first back cover, rotatably disposed on the second surface and configured to be lifted along a first direction by rotating about a first axis;
    a second back cover, rotatably disposed on the second surface and configured to be lifted along a second direction by rotating about a second axis; and
    an interlinking mechanism disposed on the second surface and connecting the first back cover and the second back cover, wherein the interlinking mechanism comprises an interlinking member movably disposed on the main body and at least one elastic member connecting the interlinking member and the main body, when the first back cover is lifted along the first direction, the elastic member exerts an elastic force on the interlinking member so as to move the interlinking member, and the interlinking member pushes the second back cover to lift the second back cover along the second direction.

2. The electronic device according to claim 1, wherein the interlinking member is movable between a first position and a second position, when the first back cover is closed and covers the main body, the first back cover pushes against the interlinking member to position the interlinking member at the first position and deforms the at least one elastic member, when the first back cover is lifted along the first direction, pushing of the first back cover against the interlinking member is released and the at least one elastic member exerts the elastic force on the interlinking member to move the interlinking member to the second position so that the interlinking member pushes the second back cover and lift the second back cover along the second direction.

3. The electronic device according to claim 2, wherein the interlinking member comprises a first inclined surface, and the second back cover comprises a second inclined surface, when the interlinking member is at the first position, the first inclined surface abuts the second inclined surface, and when the interlinking member moves from the first position to the second position, the first inclined surface pushes the second inclined surface to lift the second back cover along the second direction.

4. The electronic device according to claim 2, wherein the first back cover comprises a push member, and the push member pushes against the interlinking member when the first back cover is closed and covers the main body.

5. The electronic device according to claim 2, wherein the main body further comprises a depression formed on the second surface, the interlinking member is movably disposed within the depression, the depression comprises a first lateral wall and a second lateral wall opposite to the first lateral wall, when the interlinking member is at the first position, the interlinking member abuts the first lateral wall, and when the interlinking member is at the second position, the interlinking weber abuts the second lateral wall.

6. The electronic device according to claim 5, wherein the main body further comprises at least one accommodating portion adjacent to the depression and connected to the second lateral wall, and the at least one elastic member is disposed in the depression.

7. The electronic device according to claim 2, wherein the elastic member is a spring.

8. The electronic device according to claim 1, wherein the first axis is parallel to the second axis.

9. The electronic device according to claim 1, wherein the first axis is a virtual axis, and the second axis is a real axis.

10. The electronic device according to claim 1, wherein the first direction is opposite to the second direction.

11. The electronic device according to claim 1, further comprising a shielding member disposed on an edge of the second back cover, wherein a plurality of holes are formed on the shielding member.

\* \* \* \* \*